UNITED STATES PATENT OFFICE.

JULIAN S. GRAVELY, OF NEW HAVEN, CONNECTICUT, ASSIGNOR TO WINCHESTER REPEATING ARMS CO., OF NEW HAVEN, CONNECTICUT, A CORPORATION.

CHINESE-WOOD-OIL ADHESIVE PASTE.

1,331,192.      Specification of Letters Patent.      Patented Feb. 17, 1920.

No Drawing.      Application filed June 14, 1919. Serial No. 304,343.

*To all whom it may concern:*

Be it known that I, JULIAN S. GRAVELY, a citizen of the United States, residing at New Haven, in the county of New Haven and State of Connecticut, have invented a new and useful Improvement in Chinese-Wood-Oil Adhesive Pastes; and I do hereby declare the following to be a full, clear, and exact description of the same.

My invention relates to an improved paste for use in producing laminated paper products for use in situations in which it is essental that they shall be resistant to moisture, such as paper shot-shell bodies, flashlight cases, account-book covers, artificial wall-boards, etc., the object being to produce a paste characterized by having strong adhesive and moisture-resistant properties.

With these ends in view, my invention consists in a paste consisting of a hydrous adhesive and Chinese wood oil compounded and prepared as will be hereinafter described and pointed out in the claims.

In carrying out my invention, I have secured satisfactory results by using 75% to 90% of water, 6% to 9% of adhesive, and from 4% to 16% of Chinese wood oil, also known as tung-oil.

In preparing the paste, I proceed in the well known manner of making a cooked paste. As the paste approaches the desired ultimate consistency, the Chinese wood oil is added and the cooking continued with stirring until the emulsification of the oil has taken place. A smooth homogeneous paste of a yellowish color is thus produced. Care should be exercised in making the paste not to heat it to a sufficient degree or for a sufficient length of time to effect the polymerization of the Chinese wood oil which enters the paste unpolymerized. This paste is used in the ordinary manner. After air-drying, the paper products into which it enters are preferably subjected to a sufficient degree of heat to polymerize the Chinese wood oil in the paste, since it is the polymerization of the oil that makes the paste moisture-resistant and otherwise superior to ordinary paste for the purposes indicated.

For the adhesive element of the paste, I may employ flour, cornstarch, rice starch, potato starch, or other farinaceous material, dextrin, glue or other gelatinous material, casein or other albuminous material, or any other materials yielding an adhesive paste with water.

Paper products having superimposed sheets adhered and consolidated by means of my improved paste, upon being dried and heated are found to be uniformly solidified and present a surface which is hard and smooth and does not feel greasy to the touch. Such products may be burnished without the use of any lubricant, since their surface fibers have no tendency to stick to the burnishing tools.

I claim:—

1. A paste composed of a hydrous adhesive and unpolymerized China wood oil.
2. An emulsion of unpolymerized China wood oil in an adhesive liquid for use as a paste.
3. An adhesive paste made up of water, a farinaceous material and unpolymerized Chinese wood oil.
4. An adhesive paste made up of water, a gelatinous material and unpolymerized Chinese wood oil.
5. An adhesive paste made up of water, starch, and unpolymerized Chinese wood oil in substantially the proportions of water 75% to 90%, starch 6% to 9%, and Chinese wood oil 4% to 16%.

In testimony whereof, I have signed this specification in the presence of two subscribing witnesses.

JULIAN S. GRAVELY.

Witnesses:
     DANIEL H. VEADER,
     ERIK S. PALMER.